(12) United States Patent
Liu

(10) Patent No.: US 10,705,709 B2
(45) Date of Patent: Jul. 7, 2020

(54) PLAYING MEDIA

(71) Applicant: Qingdao Hisense Media Network Technology Co., Ltd., Qingdao, Shandong (CN)

(72) Inventor: Jihao Liu, Shandong (CN)

(73) Assignee: QINGDAO HISENSE MEDIA NETWORK TECHNOLOGY CO., LTD., Qingdao (CN)

(*) Notice: Subject to any disclaimer, the term of this patent is extended or adjusted under 35 U.S.C. 154(b) by 0 days.

(21) Appl. No.: 16/360,588

(22) Filed: Mar. 21, 2019

(65) Prior Publication Data
US 2019/0272088 A1 Sep. 5, 2019

Related U.S. Application Data

(63) Continuation of application No. PCT/CN2019/076963, filed on Mar. 5, 2019.

(30) Foreign Application Priority Data

Mar. 5, 2018 (CN) .......................... 2018 1 0180598

(51) Int. Cl.
*H04N 21/472* (2011.01)
*G06F 3/0484* (2013.01)
(Continued)

(52) U.S. Cl.
CPC ........ *G06F 3/04847* (2013.01); *G06F 3/0485* (2013.01); *G06F 3/165* (2013.01); *H04N 21/47217* (2013.01)

(58) Field of Classification Search
CPC .... G06F 3/04847; G06F 3/0485; G06F 3/165; H04N 21/47217
See application file for complete search history.

(56) References Cited

U.S. PATENT DOCUMENTS

| 9,520,155 B2* | 12/2016 | Bloch ................. G11B 27/105 |
| 2013/0071095 A1* | 3/2013 | Chauvier ............ G11B 27/005 386/343 |
| 2015/0179224 A1* | 6/2015 | Bloch ................. G11B 27/105 386/241 |

FOREIGN PATENT DOCUMENTS

| CN | 104618794 A | 5/2015 |
| CN | 104918120 A | 9/2015 |

(Continued)

OTHER PUBLICATIONS

ISA State Intellectual Property Office of the People's Republic of China, International Search Report Issued in Application No. PCT/CN2019/076963, dated May 27, 2019, WIPO, 4 pages.

*Primary Examiner* — Shen Shiau
(74) *Attorney, Agent, or Firm* — Hauptman Ham, LLP

(57) ABSTRACT

A control method for playing media includes receiving an input from a user for triggering a play progress adjustment to the media playing on a screen. The method also includes generating an instruction for play progress adjustment based on the input. The instruction includes an adjustment manner, a target position and a start position of the input. The method further includes determining a target key frame immediately before a target time corresponding to the target position. The method additionally includes decoding data of the media starting from the target key frame and blocking presentation of the decoded media data starting from the target key frame. The method also includes playing media data decoded starting from the target time in response to a system time clock progressing to the target time.

20 Claims, 5 Drawing Sheets

(51) Int. Cl.
*G06F 3/0485* (2013.01)
*G06F 3/16* (2006.01)

(56) References Cited

FOREIGN PATENT DOCUMENTS

| CN | 105208463 A | 12/2015 |
| CN | 107566918 A | 1/2018 |
| CN | 107801100 A | 3/2018 |

\* cited by examiner

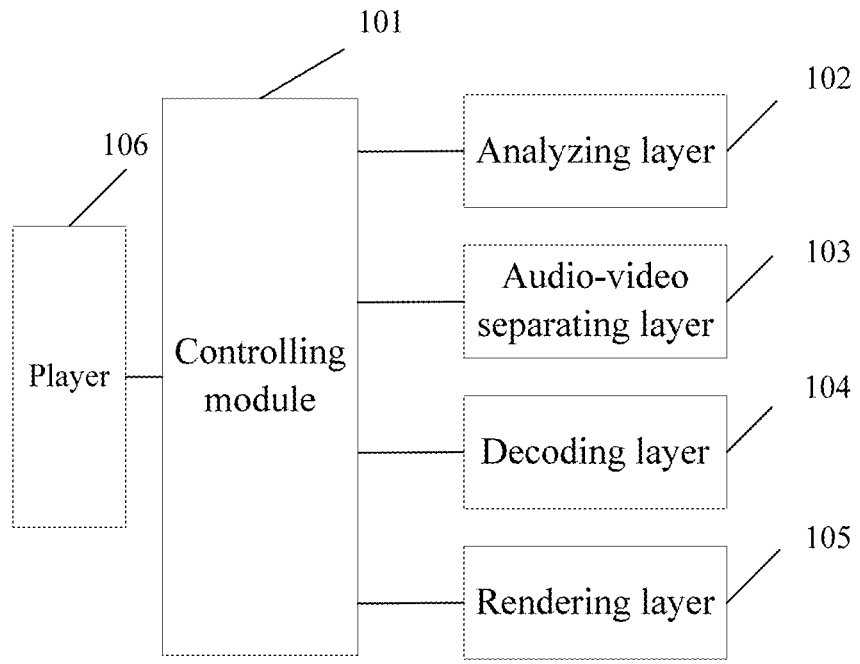
FIG. 1
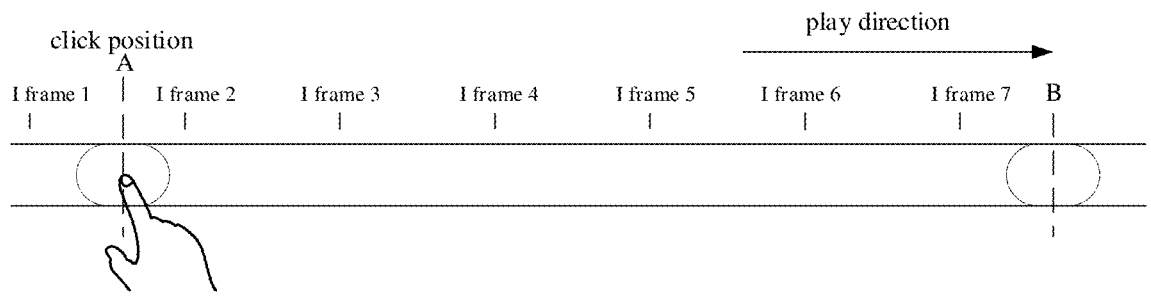
FIG. 2-A
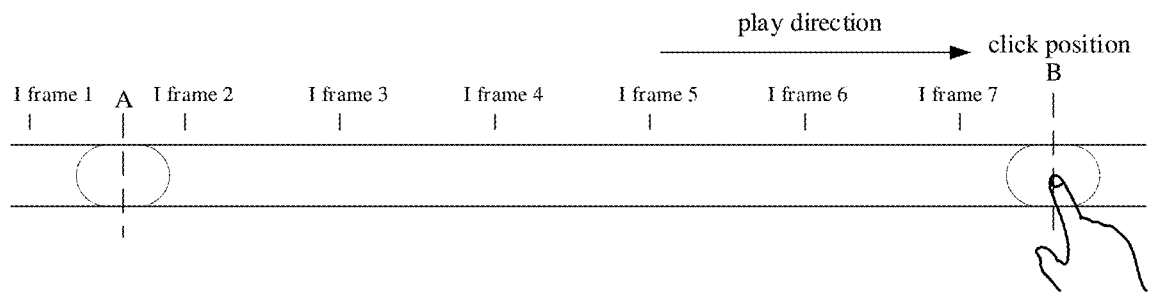
FIG. 2-B

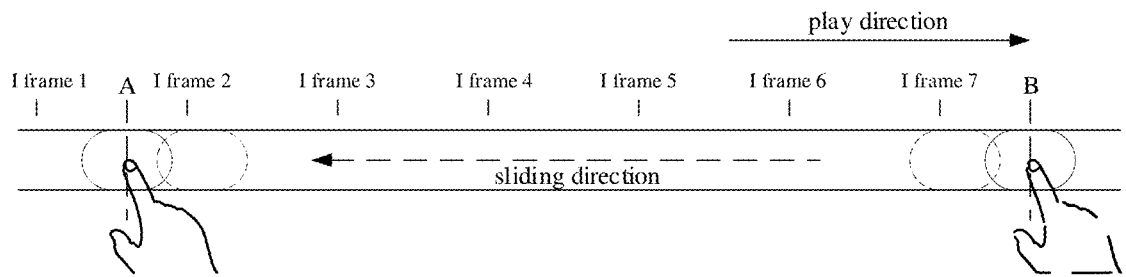
FIG. 2-C
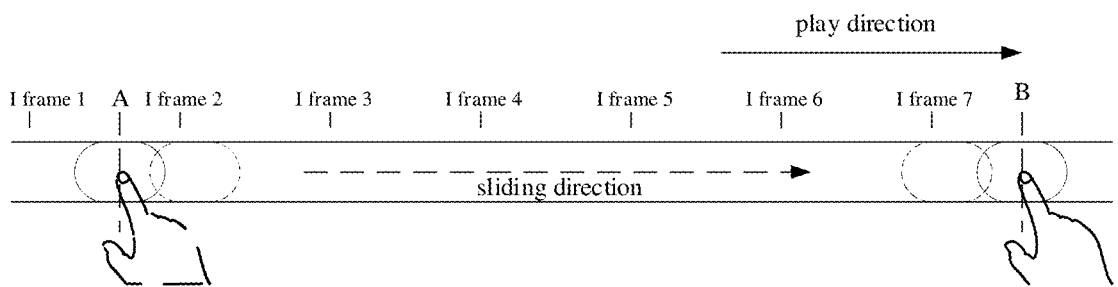
FIG. 2-D
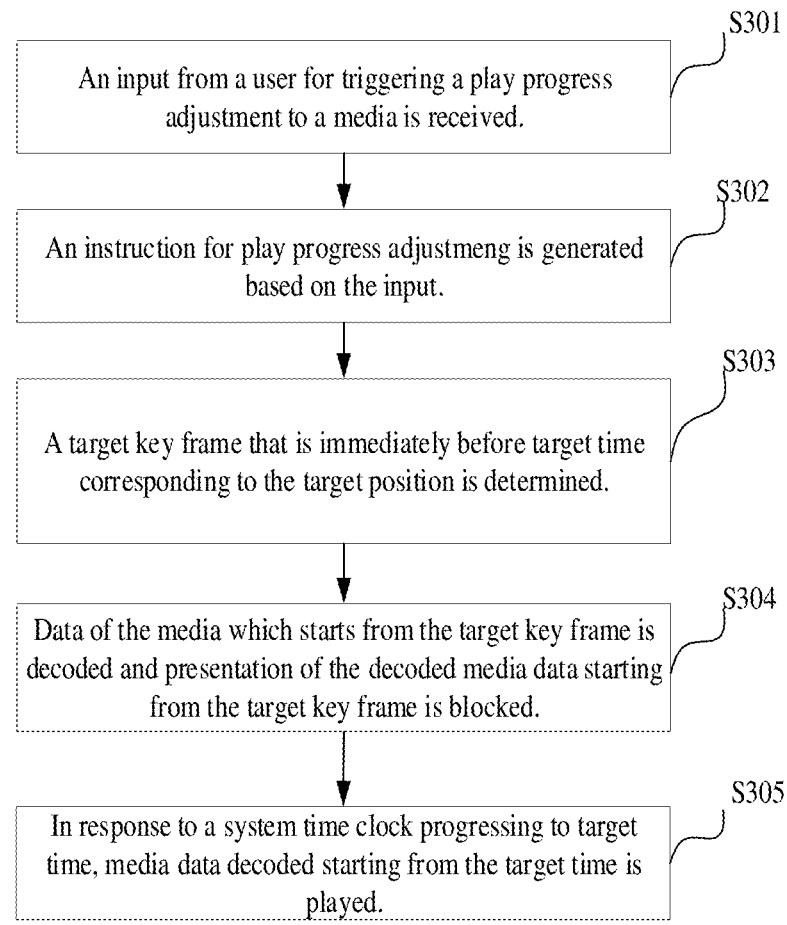
FIG. 3

PLAYING MEDIA

CROSS-REFERENCE TO RELATED APPLICATIONS

This is a continuing application of PCT Patent Application No. PCT/CN2019/076963, filed on Mar. 5, 2019, which claims priority to Chinese Patent Application No. 201810180598.5 entitled "METHOD AND APPARATUS FOR PLAYING MEDIA" filed on Mar. 5, 2018, both of which are hereby incorporated in their entireties by reference.

TECHNICAL FIELD

The present disclosure relates to multimedia technology, and in particular, to playing media.

BACKGROUND

During video playing, a video watcher may want to skip a part of the video by fast forwarding, or a video watcher may want to watch a part of the video that has already played by rewinding. Typically, the fast forwarding or rewinding is achieved by clicking or dragging a progress bar or sliding on an interface of a player.

SUMMARY

An aspect of this description is related to a control method for playing media comprising receiving an input from a user for triggering a play progress adjustment to the media playing on a screen. The method also comprises generating an instruction for play progress adjustment based on the input. The instruction comprises an adjustment manner, a target position and a start position of the input. The method further comprises determining a target key frame immediately before a target time corresponding to the target position. The method additionally comprises decoding data of the media starting from the target key frame and blocking presentation of the decoded media data starting from the target key frame. The method also comprises playing media data decoded starting from the target time in response to a system time clock progressing to the target time.

Another aspect of this description is related to media playing apparatus comprising a processor and a memory storing instructions executable by the processor. When the executable instructions are executed, the apparatus is caused to receive an input from a user for triggering a play progress adjustment to the media playing on a screen. The apparatus is also caused to generate an instruction for play progress adjustment based on the input. The instruction comprises an adjustment manner, a target position and a start position of the input. The apparatus is further caused to determine a target key frame immediately before a target time corresponding to the target position. The apparatus is additionally caused to decode data of the media which starts from the target key frame and block presentation of the decoded media data starting from the target key frame. The apparatus is also caused to, in response to a system time clock progressing to the target time, play media data decoded starting from the target time.

Another aspect of this description is related to a non-transitory computer readable storage medium having instructions stored thereon that, when executed by a processor, cause an apparatus to receive an input from a user for triggering a play progress adjustment to media playing on a screen. The apparatus is also caused to generate an instruction for play progress adjustment based on the input. The instruction comprises an adjustment manner, a target position and a start position of the input. The apparatus is further caused to determine a target key frame immediately before a target time corresponding to the target position. The apparatus is additionally caused to decode data of the media which starts from the target key frame and block presentation of the decoded media data starting from the target key frame. The apparatus is also caused to, in response to a system time clock progressing to the target time, play media data decoded starting from the target time.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1 shows a schematic diagram illustrating an architecture of a system for playing media, in accordance with one or more embodiments.

FIG. 2-A shows a schematic diagram illustrating an application scenario of rewinding by clicking when playing media, in accordance with one or more embodiments.

FIG. 2-B shows a schematic diagram illustrating an application scenario of fast forwarding by clicking when playing media, in accordance with one or more embodiments.

FIG. 2-C shows a schematic diagram illustrating an application scenario of rewinding by sliding when playing media, in accordance with one or more embodiments.

FIG. 2-D shows a schematic diagram illustrating an application scenario of fast forwarding by sliding when playing media, in accordance with one or more embodiments.

FIG. 3 shows a flowchart illustrating a method of playing media, in accordance with one or more embodiments.

DETAILED DESCRIPTION OF THE EMBODIMENTS

Figure 4:
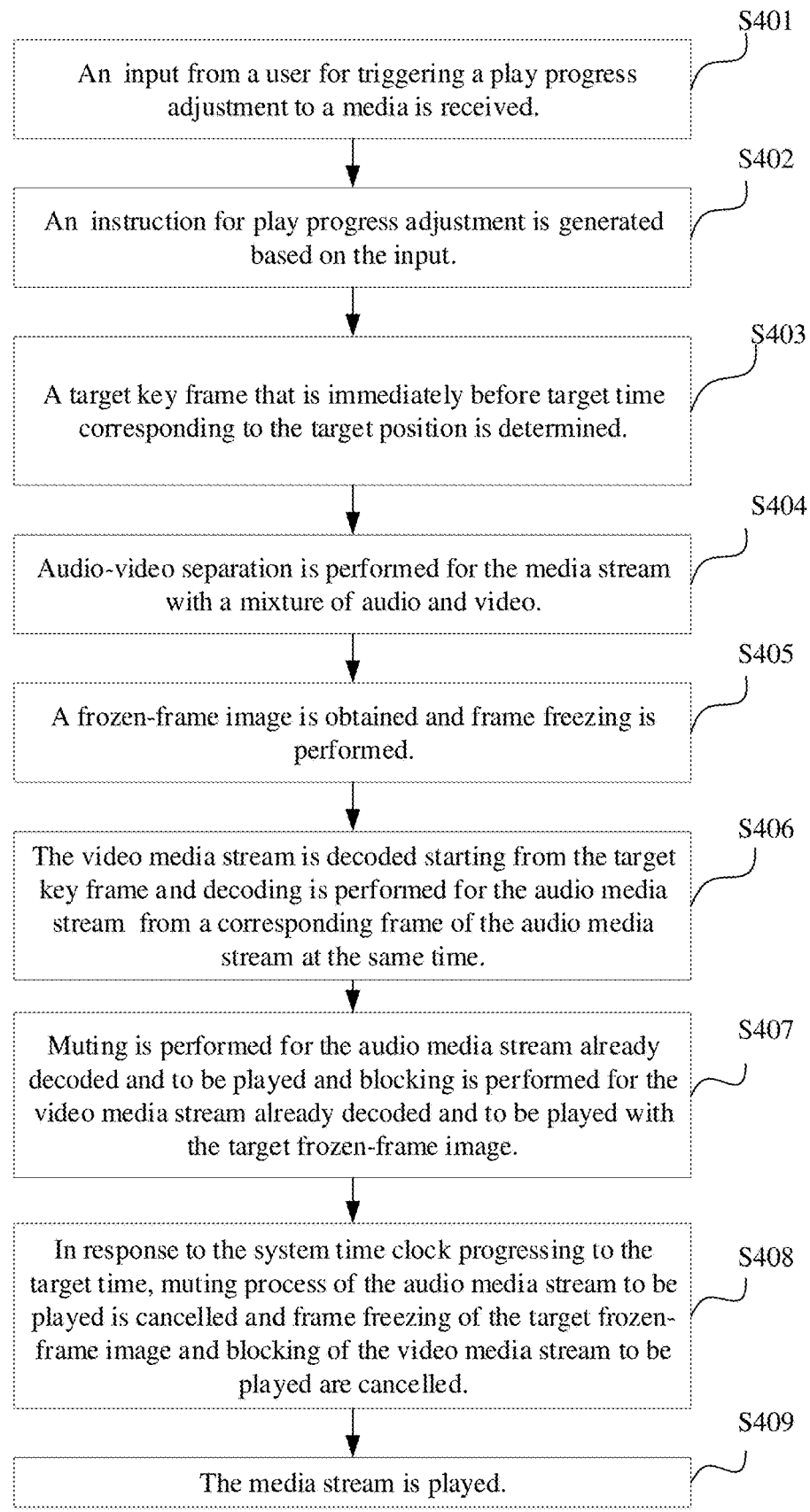
FIG. 4 shows a flowchart illustrating a method of playing media, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The examples of the present disclosure may be applied to any device capable of playing media files. The device may be a smart TV set, a smart telephone set, a personal computer (PC), a portable multimedia player and so on. It is understood that the specific device is not limited in the discussed embodiments.

For convenience of understanding, a system architecture and an application scenario involved in the discussed embodiments will be first introduced before detailed explanation is made to the discussed embodiments.

Firstly, a brief description of the system architecture is given.

FIG. 1 shows a schematic diagram illustrating an architecture of a system for playing media, in accordance with one or more embodiments. As shown in FIG. 1, the system includes a controlling module 101, an analyzing layer 102, an audio-video separating layer 103, a decoding layer 104, a rendering layer 105 and a player 106. The controlling module 101 can communicate with the analyzing layer 102, the audio-video separating layer 103, the decoding layer 104 and the rendering layer 105. The analyzing layer 102 may communicate with the audio-video separating layer 103. The audio-video separating layer 103 may communicate with the decoding layer 104 and the decoding layer 104 may communicate with the rendering layer 105. The player 106 may communicate with the controlling module 101, the analyzing layer 102, the audio-video separating layer 103, the decoding layer 104 and the rendering layer 105.

Secondly, the application scenario is discussed further below.

The application scenarios may be classified into the following four types based on different progress adjustment manners: an operation of rewinding by clicking shown in FIG. 2-A, an operation of fast forwarding by clicking shown in FIG. 2-B, an operation of rewinding by sliding shown in FIG. 2-C and an operation of fast forwarding by sliding shown in FIG. 2-D. The click operation corresponds to a click on a corresponding position of a progress bar and the slide operation corresponds not only to a slide on a progress bar but also to a slide on a player interface in some scenarios, which is not limited herein.

As shown in FIG. 2-A, a start position of a progress bar is position B, and a user may rewind progress bar from the position B to a position A by clicking on the position A with a mouse or a finger. As shown in FIG. 2-B, the start position of the progress bar is position A, the user may fast-forward progress bar from the position A to the position B by clicking on the position B with a mouse or a finger. As shown in FIG. 2-C, the initial position of the progress bar is position B, the user may rewind progress bar to the position A by sliding the mouse or sliding the finger. As shown in FIG. 2-D, the initial position of the progress bar is position A, the user may move progress to the position B by sliding the mouse or sliding the finger.

The application scenarios may be classified into the following types based on media types and playing manners:

Type 1, in which media stream is played through a webpage browser;

Type 2, in which media stream is played through a web application;

Type 3, in which local media is played through a webpage browser;

Type 4, in which local media is played through a local player; and

Type 5, in which media is played by a Digital Living Network Alliance (DLNA).

The media stream refers to media formats, for example, video or multimedia files such as audio/video stream transmit through a network. It is noted that the scenario types including but not limited to the above types are all applicable to the discussed embodiments. Illustrative descriptions are made below by taking playing media with a webpage browser as an example.

To improve video transmission and storage efficiency, data may be compressed and encoded. The most common compression and encoding is IPB, where I refers to an I frame, P refers to a P frame and B refers to a B frame. The I frame (also referred to as intra-picture) is a key frame and subjects to intra-frame compression. Decoding may be completed with a single I frame. The P frame is a predictive frame. That is, the P frame can be decoded with reference to information of a previous relevant frame. The B frame is a bi-directional interpolated prediction frame. That is, decoding can be completed with reference to the previous frame and a next frame to be decoded. For the P frame and the B frame, data compression is performed based on the I frame. In addition, there is a special I frame, which can be understood as Instantaneous Decoding Refresh (IDR) frame. When decoding is performed to the special frame, the decoder may clear all caches and a subsequent frame will not refer to them any more. The IDR frame is a special I frame and differs from a normal I frame in that the IDR frame can ensure a frame after the IDR frame will not refer to a frame before the IDR frame. Theoretically, as long as there is an IDR frame, decoding can get started from the IDR frame and a video starts to play. However, due to similar functions, the IDR frame may be directly written as the I frame in some cases. The IDR frame has a default interval of 250 frames in the most commonly used H264 encoding format.

When a media stream is being played, if a target position does not correspond to an I frame or an IDR frame, the decoder cannot start decoding directly from the target position. Thus, based on a protocol specification, a browser may actively find an I frame or an IDR frame that is immediately before target time corresponding to the target position and then start transmitting data to the player from the found frame. In most solutions, the player may perform pause( ) to pause playing and perform flush( ) to clear caches and then receive data transmitted by the browser passively and finally decode and play the data.

For different media sources, an interval of adjacent I frames or IDR frames is uncertain, which may range from 0.1 seconds to 10 seconds and mostly range from 0.5 seconds to 2 seconds. Since the decoder cannot perform decoding directly in the interval, the decoder needs to obtain one I frame that is immediately before the target time corresponding to the target position before decoding the data for continued play. In this way, a play start position will be advanced relative to the target position, resulting in inaccurate positioning. For example, when a user plays a video stream with an interval=2 s, the user may drag a progress bar to the position of the 9th second, that is, the target time corresponding to the target position is 9 s. At this time, the I frames near the position of 9 s are located at the positions of the 8th second and the 10th second, respectively. Thus, when the player requests the data of the 9th second, the browser may search for one previous I frame nearest the position of the 9th second, that is, the I frame of the 8th second. When play is recovered, the video may start playing from the 8th second, resulting in an error of one second compared with the 9th second of the target position designated by the user. Thus, the user may feel that the video cannot always locate the target position accurately. Additionally, since a progress bar may appear when a browser plays a media stream, a phenomenon that the progress bar will skip to the position of the 8th second by itself and the media stream starts playing from the 8th second after the progress bar is dragged to the position of the 9th second by seeking (fast forwarding and rewinding) may appear in the above browser interface, thereby causing a negative experience for the user.

To solve the above problems, the present disclosure provides a control method for playing media and an apparatus for playing media. After discussing the system architecture and the application scenarios involved in the discussed embodiments, detailed description will be made below for the discussed embodiments.

FIG. 3 is a flowchart illustrating a method of playing media, in accordance with one or more embodiments. The method may be applied to a device (such as a TV set, a personal computer, a laptop computer and so on) capable of playing media. As shown in FIG. 3, the method includes the following blocks.

At block S301, an input from a user for triggering a play progress adjustment to the media is received.

Optionally, the input includes an operation of rewinding by clicking shown in FIG. 2-A, an operation of fast forwarding by clicking shown in FIG. 2-B, an operation of rewinding by sliding shown in FIG. 2-C and an operation of fast forwarding by sliding shown in FIG. 2-D.

At block S302, an instruction for play progress adjustment is generated based on the input, where the instruction includes an adjustment manner, a start position and a target position of the input.

In some embodiments, the input is in a manner of a click. The adjustment manner of the input is a click. When the adjustment manner of the input is a click, the target position of play progress adjustment corresponds to a click point.

In some embodiments, the input is in a manner of a slide. The adjustment manner of the input is a slide. When the adjustment manner of the input is a slide, the target position of play progress adjustment corresponds to an end point of the slide.

At block S303, a target key frame that is immediately before a target time corresponding to the target position is determined.

In some embodiments, for a video media stream, the target key frame is the I frame or the IDR frame. In some embodiments, a Program Association Table (PAT) in a Transport Stream (TS) is obtained by use of a Packet Identifier (PID) (0x00) in the TS and then a Program Map Table (PMT) is obtained based on the information of the PMT carried in the PAT, a TS packet containing a Packetized Elementary Streams (PES) header (that is, a TS packet with a payload-unit-start-indicator being 1 in a packet header) in the PMT is obtained, information of picture_header (starting with 0x00000100) contained in the TS packet is read and then picture_coding_type (occupying 3 bits) is reached after another 10 bits (Temporal_reference occupies 10 bits). If the picture_coding_type is 001 (binary), the frame is the I frame. If the picture_coding_type is 010, the frame is the P frame. If the picture_coding_type is 011, the frame is the B frame. In this way, the target key frame that is immediately before the target time corresponding to the target position information of the play progress adjustment may be determined.

At block S304, data of the media which starts from the target key frame is decoded and presentation of the decoded media data starting from the target key frame is blocked.

In some embodiments, when a media stream is a video media stream, blocking the presentation of the decoded media data starting from the target key frame includes: blocking the video media stream decoded and to be played with a target frozen-frame image. In some embodiments, the media stream is a media stream with a mixture of audio and video, and blocking the presentation of the decoded media data starting from the target key frame includes: firstly the media stream is separated into an audio media stream and a video media stream with an audio-video separator and then muting process is performed for the audio media stream already decoded and to be played and the video media stream already decoded and to be played is blocked with the target frozen-frame image.

The frozen-frame image is aimed to ensure continuity of images in a seek process. The player will always keep displaying the last frame of image before the seek and this image of frozen frame is the frozen-frame image. Specifically, when the adjustment manner of the input is a click operation, an image of the start position of the play progress adjustment is determined as the target frozen-frame image for freezing the frame. When the adjustment manner of the input is a slide operation, the image of the start position and one or more images of the key frames (i.e. the I frames) at a fixed interval between the time corresponding to the start position and the target time are obtained sequentially for displaying during a frame freezing process. In the slide process, the image of the start position and the images of the key frames (i.e. the I frames) between the time corresponding to the start position and the target time are displayed on the screen sequentially. Finally, the I frame image that is between the time corresponding to the start position and the target time and is closer to the target time than the other key frames between the time corresponding to the start position and the target time is frozen on the screen. In some cases, the last I frame frozen on the screen is an I frame which is closer to the target time compared to the other key frames between the time corresponding to the start position and the target time.

At block S305, in response to a system time clock progressing to the target time, media data decoded starting from the target time is played.

While performing blocks S301-S304, the system time clock (STC) of the player progresses normally. In some embodiments, the media stream is a video media stream, when the STC of the player reaches the target time, playing the media data decoded starting from the target time includes: cancelling frame freezing of the target frozen-frame image and blocking of the video media stream already decoded and to be played. In some embodiments, the media stream is a media stream with a mixture of audio and video, when the STC of the player reaches the target time, playing the media data decoded starting from the target time includes: cancelling muting process of the audio media stream already decoded and to be played and cancelling frame freezing of the target frozen-frame image and blocking of the video media stream already decoded and to be played at the same time.

In some embodiments, after the input by a user for triggering the play progress adjustment to the media is received, the method disclosed may include: determining whether a time interval between adjacent key frames is less than a preset value; performing blocks S302 to S305 in response to the interval between adjacent key frames being less than the preset value; determining a target key frame that is immediately before the target time corresponding to the target position in response to the interval between adjacent key frames being no less than the preset value; and performing decoding and playing media data starting from the target key frame. In some embodiments, the above preset value may be set in the range of 1 second to 2 seconds.

To sum up, the instruction for play progress adjustment is generated based on the input by a user for triggering a play progress adjustment; and the target key frame that is immediately before the target time corresponding to the target position of play progress adjustment is determined. Decoding is performed starting from the target key frame and the presentation of the media data obtained by decoding starting from the target key frame until the target time is blocked. In response to the system time clock of the player progressing to the target time, the media data decoded starting from the target time is played. In this way, media is able to be played accurately based on a change position of a progress bar, thereby improving a user's experience.

FIG. 4 shows a flowchart illustrating a method of playing media, in accordance with one or more embodiments. The method may be applied to a device capable of playing media. Also, the device may be deployed with the system architecture shown in FIG. 1. By taking a media stream with a mixture of audio and video as an example of a media stream, the example shown in FIG. 3 will be discussed further below with reference to FIG. 1. It is noted that the type of a media stream may be determined with an analyzing layer 102. As shown in FIG. 4, the method includes the following blocks.

At block S401, an input from a user for triggering a play progress adjustment to the media is received.

At block S402, an instruction for play progress adjustment is generated based on the operation.

The instruction for indicating play progress adjustment includes an adjustment manner of the input, start position of the input and target position of the input.

At block S403, a target key frame that is immediately before target time corresponding to the target position is determined.

Specifically, a browser invokes pause( ) function of a player to pause playing the current media stream upon receiving the instruction for play progress adjustment, and transmits the target position of the play progress adjustment to the player through seek( ) function; at the same time, the analyzing layer 102 analyzes the media stream to determine the target key frame pos_I_frame that is immediately before the target time corresponding to the target position and the browser continues requesting data from a webpage.

At block S404, audio-video separation is performed for the media stream with audio and video.

In particular, upon receiving media stream requested from the webpage, the media stream is separated into an audio media stream and a video media stream with an audio-video separator in the audio-video separating layer 103. Afterwards, the audio media stream and the video media stream are sent to an audio decoder and a video decoder of the decoding layer 104, respectively.

At block S405, a frozen-frame image is obtained and frame freezing is performed.

After receiving a call for function seek( ), the player may obtain the frozen-frame image and perform frame freezing for the frozen-frame image with a function freeze( ).

At block S406, the video media stream is decoded starting from the target key frame and decoding is performed for the audio media stream starting from a corresponding frame of the audio media stream at the same time.

Specifically, the video media stream is decoded starting from the target key frame and the audio media stream is decoded starting from a corresponding frame of the audio media stream with the decoding layer 104. Since the browser requests data from the webpage based on the target key frame pos_I_frame, a frame from which audio media stream starts to decode corresponds exactly to the target key frame. For ease of description, it is described as the audio media stream is decoded starting from the target key frame. That is to say, the audio media stream is decoded starting from a time point which synchronizes with the target key frame.

It is noted that block S405 and block S406 are mutually associated in some application scenarios. A description is provided with reference to FIG. 2-A, FIG. 2-B, FIG. 2-C and FIG. 2-D.

FIG. 2-A illustrates an application scenario of rewinding by clicking. In this application scenario, the progress bar is rewound from position B to position A. First, start position B of the play progress adjustment is determined based on the play progress change instruction at block S402 and an image at position B is obtained as a frozen-frame image and the frozen-frame image is frozen on the screen. Second, decoding is performed starting from the I frame 1 of the video media stream and a corresponding frame of the audio media stream, respectively, based on block S406.

FIG. 2-B illustrates an application scenario of fast-forwarding by clicking. In this application scenario, the progress bar is fast-forwarded to position B from position A. First, start position A of play progress adjustment is determined based on the play progress change instruction at block S402 and an image at position A is obtained as a frozen-frame image and the frozen-frame image is frozen on the screen. Second, decoding is performed starting from the I frame 7 of the video media stream and a corresponding frame of the audio media stream, respectively, based on block S406.

FIG. 2-C illustrates an application scenario of rewinding by sliding. In some embodiments, in this application scenario, the play progress is rewound from position B to position A. First, start position B of play progress adjustment is determined based on the play progress change instruction at block S402 and an image at position B is obtained as a frozen-frame image for freezing; and then the images of I frame 7, I frame 6, I frame 5, I frame 4, I frame 3 and I frame 2 are obtained as frozen-frame images for freezing frames sequentially during the play progress adjustment, and decoding is performed starting from I frame 1 of the video media stream and a corresponding frame of the audio media stream, respectively, based on block S406. The frozen-frame images are obtained sequentially for freezing, so when a first frozen-frame image has been obtained for freezing, the previous frozen-frame image currently frozen on the display screen is updated with the first frozen-frame image. Thus, in this application scenario, the frozen-frame image for performing block S406 is an image of the I frame 2, which corresponds to the target frozen-frame image in block S407.

FIG. 2-D illustrates an application scenario of fast-forwarding by sliding. In some embodiments, in this application scenario, the play progress is fast-forwarded to position B from position A. First, start position A of play progress adjustment is determined based on the instruction for play progress adjustment at block S402 and an image at position A is obtained as a frozen-frame image for freezing; then the images of I frame 2, I frame 3, I frame 4, I frame 5, I frame 6 and I frame 7 are obtained sequentially as frozen-frame images for freezing. Second, decoding is performed starting from I frame 7 of the video media stream and a corresponding frame of the audio media stream, respectively, based on block S406. The frozen-frame images are obtained sequentially for freezing, so when a first frozen-frame image has been obtained for freezing, the frozen-frame image currently frozen on the display screen is updated with the first frozen-frame image. Thus, in the application scenario, the frozen-frame image for performing block S406 is an image of I frame 7 which is the target frozen-frame image in block S407.

At block S407, muting is performed for the audio media stream already decoded and to be played and blocking is performed for the video media stream already decoded and to be played with the target frozen-frame image.

In some embodiments, after the decoded media stream flows into the rendering layer 105, the player invokes mute( ) to make it work on the rendering layer 105. That is, the player invokes mute( ) to make it work on an audio renderer and a video renderer of the rendering layer 105 respectively to perform muting for an audio output and a video output respectively such that the media stream until the target time is forced to play in the backend without displaying content to front-end users.

At block S408, in response to the system time clock of the player progressing to the target time, muting process of the audio media stream to be played at this time is cancelled and frame freezing of the target frozen-frame image and blocking of the video media stream to be played at this time are cancelled.

When the system time clock goes to the target time corresponding to the target position pos_target_seek, unmute( ) is performed for media files rendered at this time and frame unfreezing is performed for the target frozen-frame image at this time by invoking unfreeze( ).

At block S409, the media stream is played.

Figure 5:
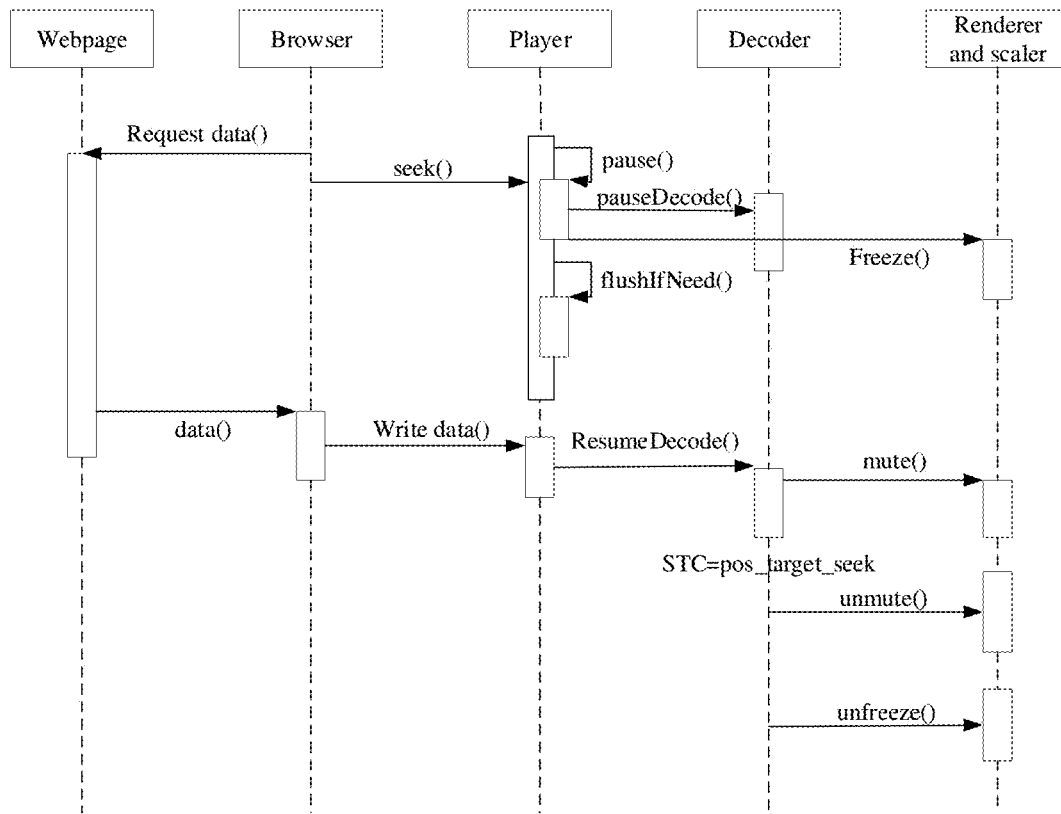
FIG. 5 shows a time sequence diagram illustrating a method of playing media, in accordance with one or more embodiments.

To understand better the relationship of different blocks shown in FIG. 4, blocks of the method shown in FIG. 4 are further described with reference to the method of playing media shown in FIG. 5. As shown in FIG. 5, after blocks S401 to S403 are performed, the method further comprises the following procedures.

A browser invokes a function of a player pause( ) to pause playing, and optionally, the browser may invoke flushIfNeed( ) to clear cache data, send the target position pos_target_seek of play progress adjustment contained in the instruction at block S402 to the player by a function seek( ) and continues requesting data from a webpage by requestData( ).

After receiving a call for the function seek( ) the player may perform frame freezing for the image by the function freeze( ), send a decoding-pausing instruction to a decoder by pauseDecode( ) and then wait for data distributed from the webpage by Data( ).

After requesting data from webpage, the browser may write the data into the player by writeData( ). After receiving the data, the player may send decoding-resuming instruction to the decoder by ResumeDecode( ). The decoder may performing decoding for the data written into the player through writeData( ) starting from the target key frame determined at block S403.

After being decoded, the data is sent to a renderer. At the same time, muting process is performed for the rendered data by invoking mute( ).

When the system time clock of the player reaches the target time corresponding to pos_target_seek, unmuting process is performed for the rendered data through unmute( ) and frame unfreezing is performed for the target frozen-frame image through unfreeze( ) at the same time.

In the above embodiments, the player is able to play accurately from the target position of the play progress after the above processing is performed. Benefits are described with reference to an example: when a user watches to the 3rd second, the user may change the play progress to the 9th second (pos_target_seek) by a click operation; the player may freeze the picture of the 3rd second and then start decoding from the position of the 8th second (pos_I_frame, assume the position of the 8th second is a position of a key frame) in the back-end and play the decoded media stream in the back-end; when the media stream played in the back-end proceeds to the 9th second, the player may perform frame unfreezing for the picture of the 3rd second and display the video output starting from the 9th second as well as play the audio, resulting in the effect of directly playing from the 9th second for users.

Figure 6:
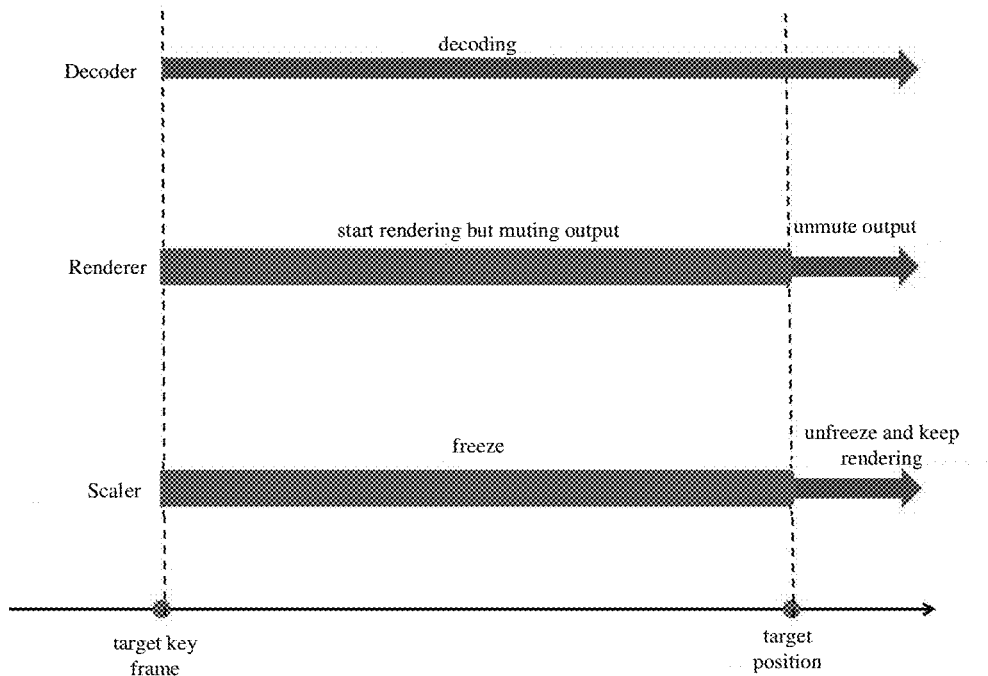
FIG. 6 shows another time sequence diagram illustrating a method of playing media, in accordance with one or more embodiments.

In addition, as shown in FIG. 6, when the player plays a video between the position pos_I_frame and the position pos_target_seek after receiving the progress adjustment instruction, the player will not return STC time progressing forward as usual to the browser but return pos_target_seek and the player will not continue to return STC time until the STC progresses to the time corresponding to pos_target_seek. In this way, when the player plays a video between the position pos_I_frame and the position pos_target_seek, the progress bar stays at the target position instead of moving to the position of pos_I_frame. Thus, the problem that the progress bar jumps back after seek is solved.

It is noted that one or more embodiments include corresponding hardware structures and/or software modules executing different functions to achieve the above functions. One or more embodiments can be implemented by hardware or by a combination of hardware and computer software in combination with units (devices) and algorithm blocks of different embodiments, and whether a function is implemented by hardware or by a computer software driven hardware depends on specific applications and design constraint conditions of the technical solution. Those skilled in the art may adopt a different method for each specific application to implement the described functions. However, the implementation shall not be regarded as exceeding the scope of technical solution of the discussed embodiments.

Based on the above method examples, one or more embodiments may perform functional units (devices) division for an apparatus for executing the above method. For example, different functional units (devices) may be divided based on corresponding functions and two or more functions may also be integrated into one processing unit (device). The above integrated units (devices) may be implemented not only by hardware but also by software functional units (devices). It is noted that division of units (devices) in the discussed embodiments are illustrative and is merely logic functional division and another division manner may also be adopted in actual implementations.

Figure 7:
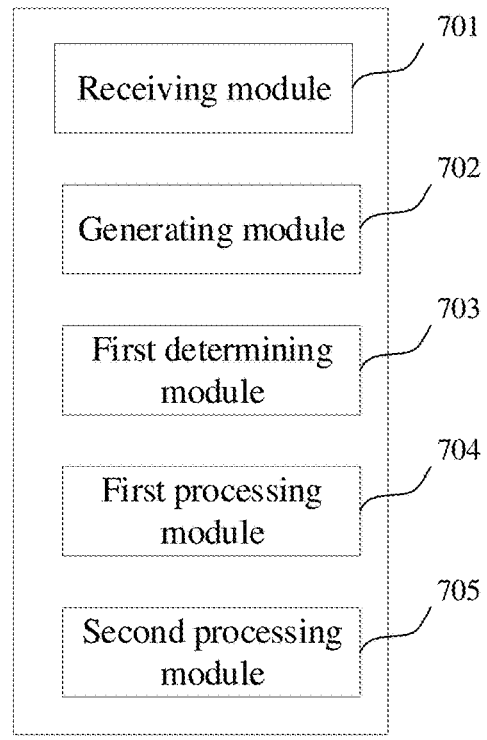
FIG. 7 shows a schematic diagram illustrating a structure of an apparatus for playing media, in accordance with one or more embodiments.

FIG. 7 illustrates an apparatus for playing media where integrated units (devices) are adapted, in accordance with one or more embodiments. As shown in FIG. 7, the apparatus includes a receiving module 701, a generating module 702, a first determining module 703, a first processing module 704 and a second processing module 705.

The receiving module 701 is configured to receive an input from a user for triggering a play progress adjustment to media playing on a screen.

The generating module 702 is configured to generate an instruction for play progress adjustment based on the input, where the instruction includes an adjustment manner of the input, start position of the input and target position of the input.

The first determining module 703 is configured to determine a target key frame that is immediately before target time corresponding to the target position.

The first processing module 704 is configured to perform decoding for data of the media starting from the target key frame and block presentation of the decoded media data starting from the target key frame.

The second processing module 705 is configured to play media data decoded starting from the target time in response to a system time clock progressing to the target time.

Optionally, the progress adjustment manner includes a click operation and a slide operation.

When the progress adjustment manner is the click operation, the target position corresponds to the position of the click operation.

When the progress adjustment manner is the slide operation, the target position corresponds to a stop position of the slide operation.

Optionally, the apparatus may also include a second determining module configured to determine whether an interval between two adjacent key frames is less than a preset value after operation input by the user for triggering a play progress adjustment is received.

Optionally, the apparatus may also include a third processing module, configured to determine a target key frame that is immediately before target time corresponding to the target position and start decoding and playing media from the found target key frame when the interval between two adjacent key frames is greater than the preset value.

Figure 8:
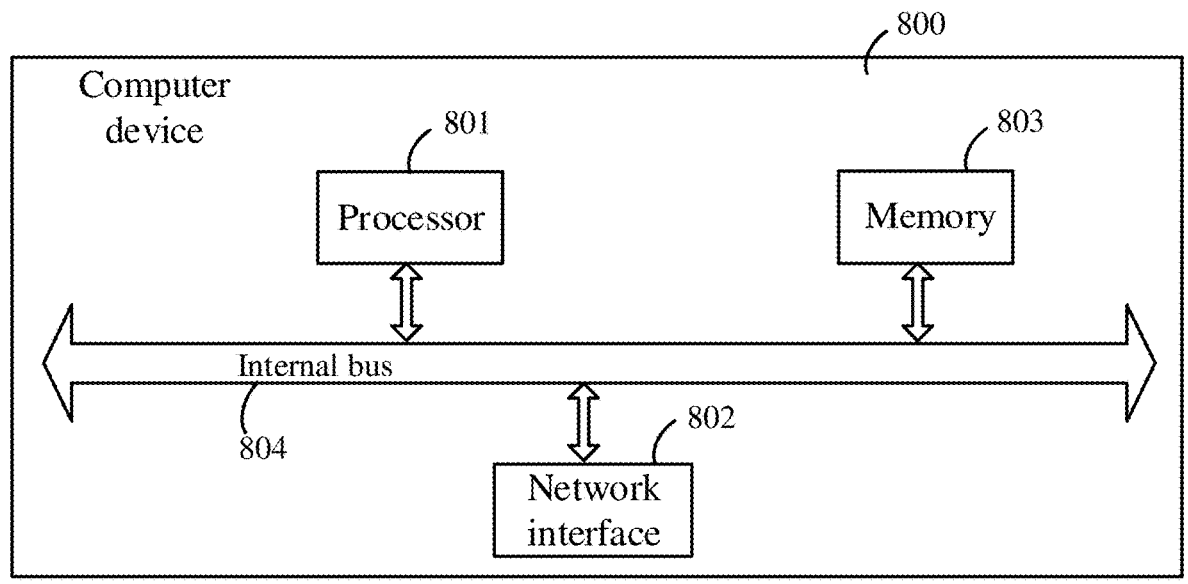
FIG. 8 shows a schematic diagram illustrating a structure of a computer device, in accordance with one or more embodiments.

FIG. 8 is a schematic diagram illustrating a structure of a computer device 800, in accordance with one or more embodiments. That is, another structural diagram of an apparatus 700 for playing media is illustrated. As shown in FIG. 8, the computer device 800 includes a processor 801 and a network interface 802. The processor 801 may be a controller. The processor 801 is configured to support the apparatus 700 for playing media to execute the functions shown in FIGS. 3-5. The network interface 802 is configured to perform functions of receiving and sending data for the apparatus 700 for playing media. The computer device 800 may also include a memory 803 configured to couple with the processor 801 and store program instructions and data required by the device. The processor 801, the network interface 802 and the memory 803 are connected via an internal bus 804. The memory 803 is configured to store instructions and the processor 801 is configured to execute instructions stored in the memory 803 to control the network interface 802 to receive and send data and complete blocks of executing corresponding functions by the apparatus 700 for playing media in the above method.

In an example of the present disclosure, a reference may be made to the descriptions of the above method or other examples for concepts, explanations, detailed descriptions and other blocks that are involved in the apparatus 700 for playing media and the computer device 800 and relate to the technical solutions of the present disclosure, which will not be described herein.

It is noted that the processors mentioned in the above discussed embodiments may be a Central Processing Unit (CPU), a general-purpose processor, a Digital Signal Processor (DSP), an Application-Specific Integrated Circuit (ASIC), a Field Programmable Gate Array (FPGA) or other programmable logic devices, transistor logic device, a hardware component or any combination thereof. The processor can implement or execute different illustrative logic blocks, modules and circuits described in combination with the present disclosure. The processor may also be a combination of realizing computation functions, for example, may be a combination including one or more microprocessors and a combination of DSP and a microprocessor and so on. The memory may be integrated into the processor and may also be configured separated from the processor.

According to various embodiments, there is also provided a computer storage medium for storing some instructions. When being executed, the instructions may cause a processor to implement any one of the above methods involved in the apparatus for playing media.

According to various embodiments, there is also provided a computer program product for storing computer programs. The computer programs are used to execute the method of playing media in accordance with some embodiments.

The persons skilled in the art should understand that one or more embodiments may be provided as a method, a system, or a computer program product. Thus, entire hardware embodiments, entire software embodiments or embodiments combining software and hardware may be adopted in the present disclosure. Further, the present disclosure may be implemented in the form of a computer program product that is operated on one or more computer available storage media (including but not limited to magnetic disk memory, CD-ROM, optical memory and so on) including computer available program codes.

One or more embodiments are described by referring to flowcharts and/or block diagrams of a method, a device (a system) and a computer program product. It is understood that each flowchart and/or block in the flowcharts and/or the block diagrams or a combination of a flow chart and/or a block of the flowcharts and/or the block diagrams may be implemented by computer program instructions. These computer program instructions may be provided to a general-purpose computer, a dedicated computer, an embedded processor, or a processor of another programmable data processing device to generate a machine so that the instructions executable by a computer or a processor of another programmable data processing device generate an apparatus for implementing functions designated in one or more flows of the flowcharts and/or one or more blocks of the block diagrams.

Further, these computer program instructions may also be stored in a computer readable memory that can direct a computer or another programmable data processing device to work in a particular manner so that the instructions stored in the computer readable memory generate a product including an instruction apparatus, and the instruction apparatus can implement functions designated in one or more flows of the flowcharts and/or one or more blocks of the block diagrams.

The computer program instructions may also be loaded on a computer or another programmable data processing devices so that a series of operation blocks can be executed on the computer or another programmable device to generate processing achieved by the computer, and thus instructions executable on the computer or another programmable device are provided for blocks for realizing functions designated in one or more flows of the flowcharts and/or one or more blocks of the block diagrams.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A control method for playing media, comprising:
   receiving an input from a user for triggering a play progress adjustment to the media playing on a screen;
   generating an instruction for play progress adjustment based on the input, wherein the instruction comprises an adjustment manner, a target position and a start position of the input;
   determining a target key frame immediately before a target time corresponding to the target position;
   decoding data of the media starting from the target key frame and blocking presentation of the decoded media data starting from the target key frame; and
   playing media data decoded starting from the target time in response to a system time clock progressing to the target time.

2. The method according to claim 1, wherein the adjustment manner comprises a click, and the target position corresponds to a click point.

3. The method according to claim 2, wherein blocking the presentation of the decoded media data starting from the target key frame comprises:
   performing a frame freezing for a first picture at a time of receiving the click operation on a play interface of the media.

4. The method according to claim 3, further comprising:
   performing a muting process for an audio output in the decoded media data which starts from the target key frame until the target time.

5. The method according to claim 4, further comprising:
   in response to a system time clock progressing to the target time, cancelling the frame freezing for the first picture and cancelling the muting process for the audio output.

6. The method according to claim 3, further comprising:
   in response to a system time clock progressing to the target time, cancelling the frame freezing for the first picture.

7. The method according to claim 1, wherein the adjustment manner comprises a slide operation, and the target position corresponds to an end point of the slide.

8. The method according to claim 7, wherein blocking the presentation of the decoded media data starting from the target key frame comprises:
   displaying a first picture at a time of receiving the slide operation, one or more key frames between a time corresponding to the first picture and the target time, and then performing a frame freezing for a second picture corresponding to a key frame between the time corresponding to the first picture and the target time and which is closer to the target time than other key frames.

9. The method according to claim 8, further comprising:
   performing a muting process for an audio output in the decoded media data which starts from the target key frame until the target time.

10. The method according to claim 9, further comprising:
    in response to a system time clock progressing to the target time, cancelling the frame freezing for the second picture and cancelling the muting process for the audio output.

11. The method according to claim 8, further comprising:
    in response to a system time clock progressing to the target time, cancelling the frame freezing for the second picture.

12. The method according to claim 1, further comprising:
    after receiving the input, determining whether a time interval between two adjacent key frames is less than a preset value;
    in response to the time interval being no less than the preset value, determining a key frame that is immediately before the target time corresponding to the target position as the target key frame; and
    starting decoding and playing the media starting from the target key frame.

13. A media playing apparatus comprising:
    a processor; and
    a memory storing instructions executable by the processor, wherein when the executable instructions are executed, the apparatus is caused to:
    receive an input from a user for triggering a play progress adjustment to the media playing on a screen;
    generate an instruction for play progress adjustment based on the input, wherein the instruction comprises an adjustment manner, a target position and a start position of the input;
    determine a target key frame immediately before a target time corresponding to the target position;
    decode data of the media which starts from the target key frame and block presentation of the decoded media data starting from the target key frame; and
    in response to a system time clock progressing to the target time, play media data decoded starting from the target time.

14. The apparatus according to claim 13, wherein, when blocking the presentation of the decoded media data starting from the target key frame, the apparatus is caused to:
    perform a frame freezing for a first picture at a time of receiving a click operation on a play interface of the media.

15. The apparatus according to claim 14, wherein the executable instructions also cause the apparatus to:
    perform a muting process for an audio output in the decoded media data which starts from the target key frame until the target time.

16. The apparatus according to claim 14, wherein the executable instructions also cause the apparatus to:

in response to a system time clock progressing to the target time, cancel the frame freezing for the first picture.

17. The apparatus according to claim 13, wherein, when blocking the presentation of the decoded media data starting from the target key frame, the apparatus is caused to:
display a first picture at a time of receiving a slide operation, one or more key frames between time corresponding to the first picture and the target time, and then perform a frame freezing for a second picture corresponding to a key frame between a time corresponding to the first picture and the target time and which is closer to the target time than other key frames.

18. The apparatus according to claim 17, wherein the executable instructions also cause the apparatus to:
in response to a system time clock progressing to the target time, cancel the frame freezing for the second picture.

19. The apparatus according to claim 13, wherein, after the input is received, the executable instructions also cause the apparatus to:
determine whether an interval between adjacent key frames is less than a preset value;
in response to the interval between adjacent key frames being no less than the preset value, determine the target key frame immediately before the target time corresponding to the target position; and
start decoding and playing the media starting from the target key frame.

20. A non-transitory computer readable storage medium having instructions stored thereon that, when executed by a processor, cause an apparatus to:
receive an input from a user for triggering a play progress adjustment to media playing on a screen;
generate an instruction for play progress adjustment based on the input, wherein the instruction comprises an adjustment manner, a target position and a start position of the input;
determine a target key frame immediately before a target time corresponding to the target position;
decode data of the media which starts from the target key frame and block presentation of the decoded media data starting from the target key frame; and
in response to a system time clock progressing to the target time, play media data decoded starting from the target time.

* * * * *